(12) United States Patent
Juzak et al.

(10) Patent No.: US 11,365,831 B2
(45) Date of Patent: Jun. 21, 2022

(54) PLASTIC PIPE CLIP

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V, Mijdrecht (NL)

( * ) Notice: Subject to any disclaimer, the term of this patent is extended or adjusted under 35 U.S.C. 154(b) by 280 days.

(21) Appl. No.: 16/733,722

(22) Filed: Jan. 3, 2020

(65) Prior Publication Data
US 2020/0224796 A1 Jul. 16, 2020

(30) Foreign Application Priority Data
Jan. 14, 2019 (NL) ..................................... 2022398

(51) Int. Cl.
*F16L 3/127* (2006.01)
*F16L 3/13* (2006.01)

(52) U.S. Cl.
CPC ................. *F16L 3/127* (2013.01); *F16L 3/13* (2013.01)

(58) Field of Classification Search
CPC ..... F16L 3/127; F16L 3/13; F16L 3/12; F16L 55/035; F16L 3/1207; F16B 2/20; F16B 2/22; F16B 2/10
USPC ........ 248/74.1–74.3, 74.5; 24/489, 498, 499, 24/530, 545
See application file for complete search history.

(56) References Cited

U.S. PATENT DOCUMENTS

| | | | | |
|---|---|---|---|---|
| 84,448 A | * | 11/1868 | Watson | ..................... B42F 1/06 24/563 |
| 1,429,182 A | * | 9/1922 | Ashley | ..................... B42F 1/006 24/557 |
| 1,590,682 A | * | 6/1926 | Hart | .................... B65D 33/1666 383/68 |
| 2,355,742 A | * | 8/1944 | Morehouse | ........... F16L 3/2235 248/68.1 |
| 3,266,761 A | * | 8/1966 | Walton | .................. F16L 3/1207 248/71 |
| 3,313,009 A | * | 4/1967 | Beckerer | ................... F16L 3/13 248/74.2 |
| 3,370,815 A | | 2/1968 | Opperthauser | |
| 3,684,223 A | | 8/1972 | Logsdon | |

(Continued)

FOREIGN PATENT DOCUMENTS

FR 1230280 9/1960
IT TV20110156 5/2013

OTHER PUBLICATIONS

Search Report for NL 2022398 dated Sep. 18, 2019 (27 pages).
European Search Report for EP 19217594.1 dated Sep. 8, 2020 (15 pages).

*Primary Examiner* — Ingrid M Weinhold
(74) *Attorney, Agent, or Firm* — Tutunjian & Bitetto, P.C.

(57) ABSTRACT

A plastic pipe clip includes a slitted annular body having a through slit to allow receiving a pipe in the annular body. The pipe clip includes pair of mounting flanges integrally formed on the annular body on an opposite side of the annular body as the side where the slit is located. The mounting flanges each having a support surface and at least one mounting hole adapted to mount the pipe clip to a support structure. The mounting flanges are arranged and configured to be pinched together so as to open the slit on the opposite side of the annular body.

3 Claims, 6 Drawing Sheets

(56) References Cited

U.S. PATENT DOCUMENTS

| | | | |
|---|---|---|---|
| 4,309,007 A | | 1/1982 | Logsdon |
| 4,471,512 A | * | 9/1984 | Thalenfeld ............ A47F 5/0869 |
| | | | 24/557 |
| 4,978,090 A | * | 12/1990 | Wichert ................ F16L 3/1041 |
| | | | 248/74.1 |
| D316,219 S | * | 4/1991 | Boehnke ........................ D8/373 |
| 5,236,158 A | * | 8/1993 | Condon ..................... F16L 3/24 |
| | | | 248/57 |
| 5,261,633 A | * | 11/1993 | Mastro ...................... F16L 3/18 |
| | | | 248/68.1 |
| 5,435,506 A | * | 7/1995 | Wiley ....................... F16L 3/10 |
| | | | 248/74.1 |
| 5,625,931 A | | 5/1997 | Visser et al. |
| D408,273 S | * | 4/1999 | Senninger ..................... D8/356 |
| 6,152,412 A | * | 11/2000 | Basickes ................. F16L 3/127 |
| | | | 248/317 |
| 6,390,421 B1 | * | 5/2002 | Rudd ...................... F16L 3/133 |
| | | | 248/62 |
| 6,519,791 B2 | | 2/2003 | Randolph |
| 6,669,150 B2 | * | 12/2003 | Benoit ................. F16B 21/084 |
| | | | 248/71 |
| D506,385 S | * | 6/2005 | Brown ........................... D8/394 |
| 8,500,073 B2 | * | 8/2013 | Quesnel ................ H02G 7/053 |
| | | | 248/74.4 |
| 9,482,369 B2 | * | 11/2016 | Sampson .............. F16L 3/1058 |
| 9,777,871 B1 | * | 10/2017 | Tian ...................... F16L 3/1207 |
| 10,927,979 B2 | * | 2/2021 | Harris ................... F16L 3/1218 |
| 2009/0083954 A1 | * | 4/2009 | Hoggan ................. B65D 35/24 |
| | | | 24/563 |
| 2017/0276263 A1 | * | 9/2017 | Tian .......................... F16B 1/00 |
| 2018/0156102 A1 | * | 6/2018 | Sun ........................... F16L 3/16 |

\* cited by examiner

PLASTIC PIPE CLIP

BACKGROUND OF THE INVENTION

The present invention relates to plastic pipe clips. In particular it relates to pipe clips comprising a slitted annular body having a through slit to allow receiving a pipe in the annular body and a pair of mounting flanges integrally formed on the annular body. The mounting flanges each have a support surface and at least one mounting hole adapted to mount the pipe clip to a support structure, such as a stub-out bar as is disclosed for example in U.S. Pat. No. 6,519,791 B2. Pipe clips of this type are for example known as Holdrite® suspension clamp series and Holdrite® standard clamp series. The flanges on these Holdrite® clips are formed adjacent the slit in the annular body. A disadvantage of these known pipe clips is that a user needs two hands to open them to be able to arrange the pipe clip on the pipe.

SUMMARY OF THE INVENTION

One aspect of the invention relates to a plastic pipe clip comprising a slitted annular body having a through slit to allow receiving a pipe in the annular body, and a pair of mounting flanges integrally formed on the annular body on an opposite side of the annular body as the side where the slit is located, the mounting flanges each having a support surface and at least one mounting hole adapted to mount the pipe clip to a support structure. The mounting flanges are arranged and configured to be pinched together so as to open the slit on the opposite side of the annular body. The flanges can be pinched by one hand. Therefore the pipe clip according to this aspect of the invention allows a single handed installation by the user on the pipe. This is contrary to the pipe clips known from the prior art mentioned above. The pipe clips according to this aspect of the invention thus provide a more convenient installation compared to the known pipe clips.

In a possible embodiment of the pipe clip a hinging zone is formed in the annular body between the flanges. This hinging zone may facilitate the opening of the pipe clip such that the pipe clip can more easily be installed on the pipe single handed.

In a possible embodiment the flanges are formed as ears extending from the annular body. These ears provide a sufficient length and thus lever which allows an easier pinching together of the flanges and thereby opening of the pipe clip upon installation on a pipe.

In a possible further embodiment the annular body has opposite axial ends and the support surface of the mounting flanges lies in the same plane as one of the axial ends of the annular body. Thus said one of the axial ends and the support surface of the flanges can be arranged against a common plane surface of a structural member such as profiled section elements or beams.

In a possible embodiment a second pair of mounting flanges is integrally formed on the annular body on either side adjacent the slit and extending from the annular body, the mounting flanges of the second pair each having a support surface and at least one mounting hole adapted to mount the pipe clip to a support structure, wherein the flanges of the second pair have a support surface which is perpendicular to a support surface of the flanges on the opposite side of the annular body. The second pair of mounting flanges makes the pipe clip more versatile to use. The pipe clip can be used to either install pipes that run perpendicular to the plane of the surface where the flanges of the first pair are mounted to, or to install pipes parallel to the plane of the surface the flanges of the second pair are mounted to.

In a possible embodiment the flanges of the second pair and the annular body define an omega shape seen in a front view in the axial direction of the annular body.

In a possible embodiment the annular body has a closure mechanism adapted to maintain the annular body closed at the slit. This may in particular facilitate maintaining the annular pipe clip body closed in an embodiment of the pipe clip that does not have the second pair of flanges, or in the event that the pipe clip does have the second pair of flanges, but these flanges ore not mounted to a mounting structure such as a profiled section element. The closure mechanism may comprise snap connection members or may comprise a hook closure.

Another aspect of the invention relates to a plastic pipe clip comprising a slitted annular body having a through slit to allow receiving a pipe in the annular body. The plastic pipe clip according to this aspect furthermore comprises a pair of first mounting flanges integrally formed on the annular body on an opposite side of the annular body as where the slit is located, and a pair of second mounting flanges integrally formed on the annular body flanking the slit and extending from the annular body, the first mounting flanges having mounting holes adapted to mount the pipe clip to a support structure, the second mounting flanges having mounting holes adapted to mount the pipe clip to a support structure. The first flanges have respective first support surfaces to be positioned against a support structure and the second flanges have respective second support surfaces to be positioned against a support structure, wherein the first support surfaces define a first plane and the second support surfaces define a second plane, wherein the first plane and the second plane are perpendicular to each other. The first and second mounting flanges make the pipe clip versatile to use. The pipe clip can be used to install pipes that run perpendicular to the plane of the surface where the second flanges are mounted to, or the pipe clip can be used to install pipes parallel to the plane of the surface the first flanges are mounted to.

In a practical embodiment the second flanges and the annular body may define an omega shape seen in a front view in the axial direction of the annular body and the first flanges may be formed as ears extending from the annular body.

Yet another aspect of the invention relates to a plastic pipe clip comprising a slitted annular body having a through slit to allow receiving a pipe in the annular body, and a pair of mounting flanges integrally formed on the annular body, the mounting flanges each having a support surface and at least one mounting hole adapted to mount the pipe clip to a support structure. The pipe clip according to this aspect furthermore comprises a separate annular insert part adapted to be inserted in the annular body and having a through slit to receive a pipe in the annular insert part. The annular body has axial grooves on a radially inner side thereof, said grooves extending in an axial direction of the annular body, and the insert part has axial splines on a radially outer side adapted to be received in the grooves. The configuration of a pipe clip and an insert part allows the use of one clip body which may be used for a certain pipe diameter, and which may be combined with an insert adapted for use with a pipe of a smaller diameter. There may be several insert parts with different inner diameters available for combination with the annular clip body, to make the pipe clip suitable for different pipe diameters.

In a possible further embodiment according to this aspect of the invention the splines and the grooves have a dovetail shape. This allows an interlocking coupling in the radial direction of the annular clip body, whereas the insert part can be inserted in the axial direction of the annular clip body if necessary.

In a possible further embodiment according to this aspect of the inventions the annular insert part and the annular body have a locking formation to interlock the insert part and the annular body in an axial direction when the insert part is inserted in the annular body. The interlocking formation secures the insert part in the annular clip body in the axial direction whereby the insert part and the interlocking formation can be handled as a unit without the risk that the insert is lost during installation works. The respective locking formations of the insert part and the annular body may be formed diametrically opposite the respective slits of the insert part and the annular body.

The different aspects of the invention mentioned in the above may also be combined.

DETAILED DESCRIPTION

Figure 1:
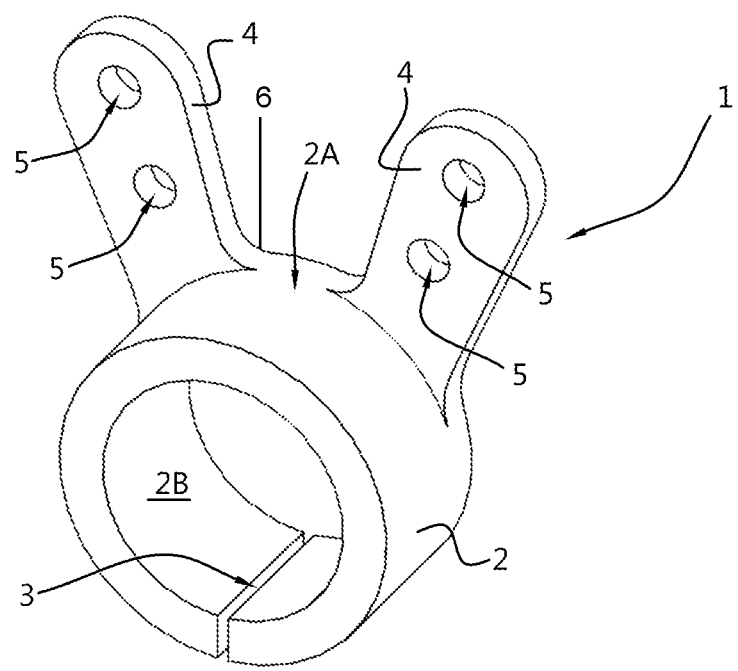
FIG. 1 shows a view in perspective of an embodiment of a pipe clip according to the invention.

In FIG. 1 a plastic pipe clip 1 is shown, which pipe clip 1 may be made by injection moulding or another suitable forming process. The pipe clip 1 includes an annular clip body 2 which has a generally circular cross section. A longitudinal through slit 3 is formed in the annular body 2, wherein the longitudinal slit 3 extends from one axial end to the other axial end of the annular body 2. The annular clip body 2 is at least partially flexible such that it can be bent open to open the longitudinal slit 3.

The pipe clip 1 furthermore has two flanges 4 formed in one piece with the annular body 2 and extending therefrom. The flanges 4 are formed as ears. The flanges 4 each have two mounting holes 5 through which fastening elements such as screws can pass. The flanges 4 have a support surface 6 which is on the rear side in the view of FIG. 1. The support surface 6 is flush with one of the head ends of the annular body 2, such that the support surfaces 6 and the head end can rest against a flat surface of a support structure and fixed thereto by screws or other fastening means.

The pipe clip 2 is of a symmetric design in that it has a plane of symmetry that extends through the slit 3 and through a centre axis of the annular body 2. The flanges 4 are arranged symmetrically with respect to the plane of symmetry and on an opposite side of the annular body 2 than where the slit 3 is located. This design makes it possible to pinch the flanges 4 together, whereby a portion 2A of the annular clip body 2 located between the flanges 4 and opposite the slit 3 is elastically deformed and serves as a hinge portion and whereby the slit 3 is spread open so as to allow insertion of a pipe in the clip body 2 in the transverse direction of the pipe. The elongate ear shape of the flanges 4 increase the lever arm for pinching the flanges together, thereby facilitating that the flanges 4 may be pinched together by one hand only. The opening of the pipe clip to arrange it over a pipe by pinching the flanges 4 is somewhat comparable to the working of a clothes-peg or clothes-pin.

The inner surface 2B of the annular clip body 2 is smooth. However this inner surface may be provided with a rough surface or with ribs or the like to enhance the grip of the pipe clip 1 on the pipe. The annular clip body 2 has an inner diameter which is substantially the same as the outer diameter of the pipe it is intended for.

In FIGS. 2-5 another embodiment of a plastic pipe clip according to the invention is shown. This pipe clip, indicated by reference numeral 11, includes an annular clip body 12. In analogy with the embodiment of FIG. 1 it has a longitudinal through slit 13 formed in the annular body 12. The annular clip body 12 is at least partially flexible to be able to open the longitudinal through slit 13.

Figure 3:
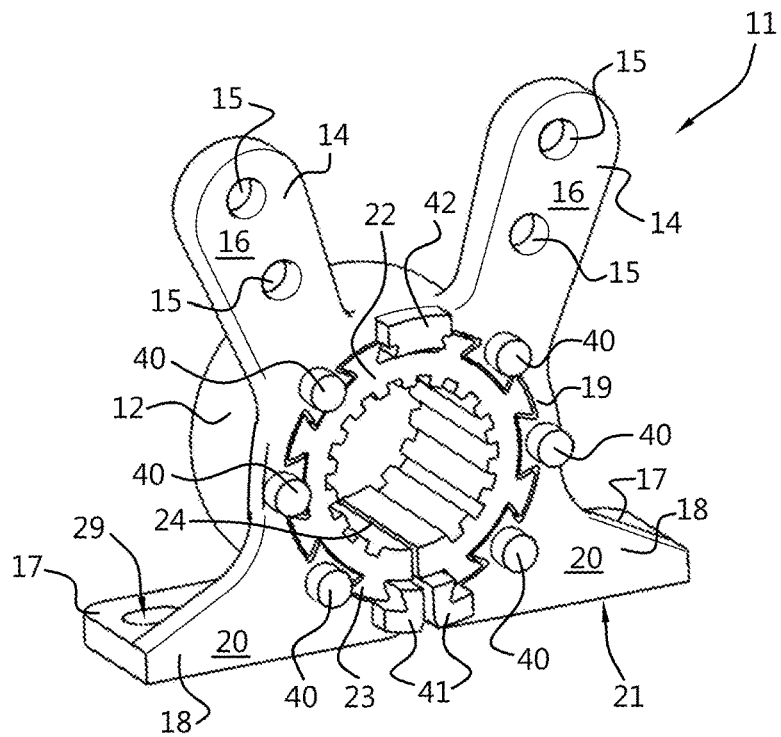
FIG. 3 shows another view in perspective of the pipe clip of FIG. 2.
Figure 4:
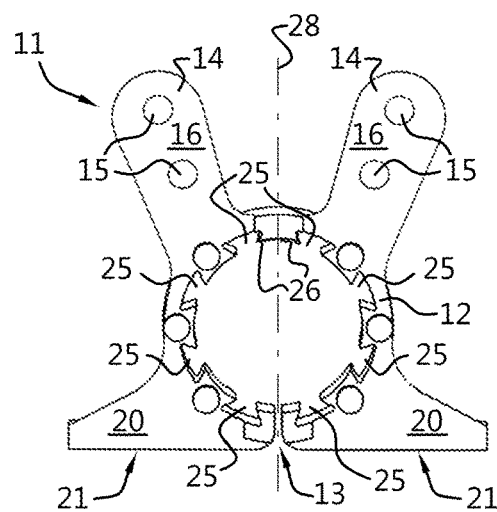
FIG. 4 shows a front elevational view of the pipe clip of FIG. 2, without an insert part, in a closed state.
Figure 5:
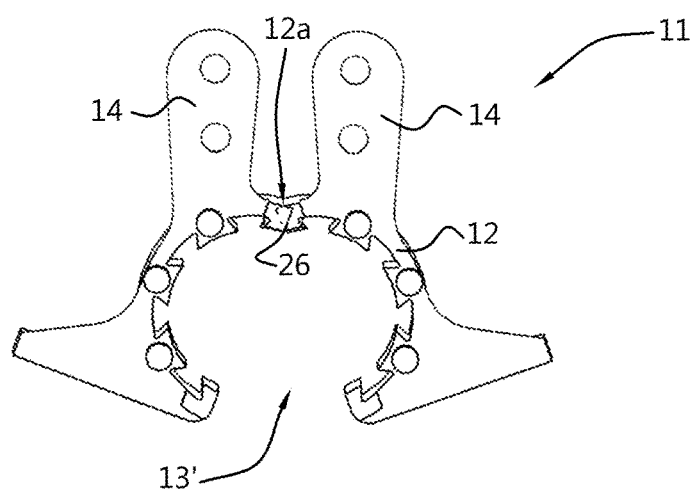
FIG. 5 shows a front elevational view of the pipe clip of FIG. 2, without an insert part, in an open state.

Furthermore, the pipe clip 11 has a pair of first flanges 14 which in location and shape are similar to the flanges 4 of the pipe clip 1 of FIG. 1, i.e. the first flanges 14 are arranged on an opposite side of the clip body 12 than the location of the slit 13 and are arranged symmetrically with respect to a plane of symmetry 28 that extends through the slit 13 and which is indicated in FIG. 4 by a dashed line. The flanges 14 have a support surface 16 which is shown in the view of FIGS. 3-5. The support surface 16 is flush with one of the head ends 19 of the annular body 12, such that the support surfaces 16 and the head end 19 can rest against a flat surface of a support structure and fixed thereto by screws or other fastening means.

The flanges 14 have mounting holes 15; in the particular embodiment shown in the figures each flange 14 has a pair of holes 15. The mounting holes 15 can be used to pass a screw or other suitable fastening element through to fix the pipe clip 11 to a support structure (cf. FIG. 6).

A difference with the embodiment of FIG. 1 is that the pipe clip of FIGS. 2-5 has a pair of second flanges 17. These second flanges 17 extend in a tangential direction of the annular clip body 12 at the location of the slit 13. Thus, in other words, the second flanges 17 are connected to the annular body adjacent the slit 13 and extend in a tangential direction away from the slit 13. The second flanges 17 and the annular clip body 12 are furthermore connected by a web 18 which provides rigidity to the pipe clip 11. A support surface 20 of the web 18 lies flush with the head end 19 of the annular clip body 12 and the support surface 16 of the first flanges 14 as is best visible in FIG. 3. The second flanges 17 have a support surface 21 (cf. FIG. 6) which is facing away from the annular clip body 12. The support surface 21 of the second flanges 17 is perpendicular to the support surface 20 of the web 18 and the support surface 16 of the first flanges 14 as is best visible in FIG. 3. A mounting hole 29 is formed in each one of the second flanges 17.

Figure 2:
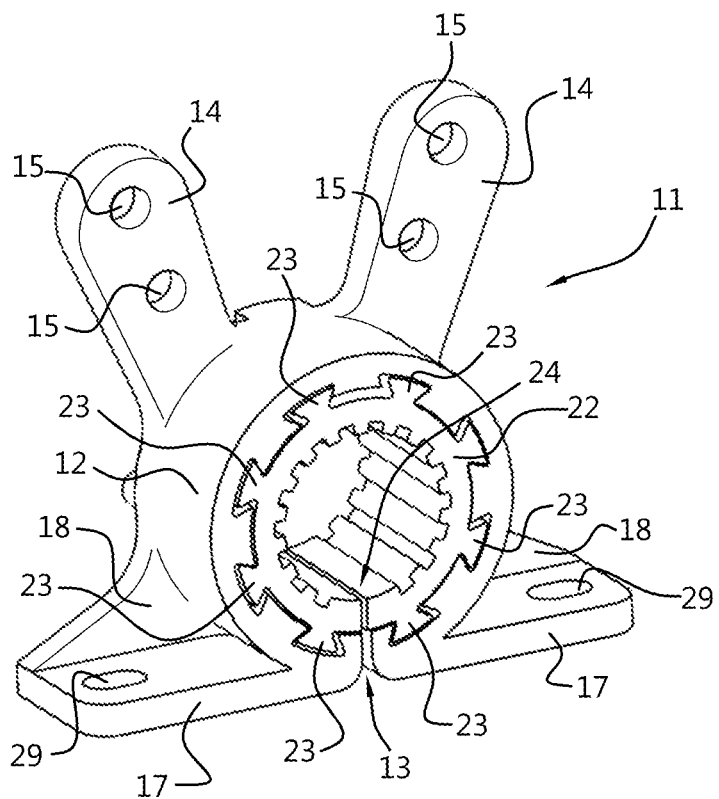
FIG. 2 shows a view in perspective of another embodiment of a pipe clip according to the invention, including an insert part.

In FIGS. 2 and 3 is shown that the pipe clip 11 includes an annular insert 22. The annular insert 22 is a separate part which may be assembled with the annular clip body 12. The annular insert 22 may be made of the same material as the annular clip body 12, but may also be made of a different material, e.g. a material providing a better grip or having better vibration insulating properties. The material must at least flexible such that the annular insert 22 is conveniently elastically deformable.

The annular insert 22 has a through slit 24. The annular insert 22 is at least partially flexible such that the insert 22 can be deformed and the slit 24 can be widened such that the insert 22 can be arranged over a pipe just like the clip body 12. The annular insert 22 can be inserted in the axial direction in the annular clip body 12. The annular insert part 22 is formed with longitudinal splines 23 distributed over the outer surface of the insert part 22. The splines 23 have a dovetail shape, seen in cross section. The annular clip body 12 has complementary grooves 25, thus also having a dovetail shape. In FIG. 4 the pipe clip 11 is shown without the insert part 22. In this figure the grooves 25 are visible and indicated. The splines 23 can be inserted in the grooves 25 from one head end of the pipe clip 11. The assembled state is shown in FIGS. 2 and 3. The pipe clip 11 can be used with an insert part 22 to hold a pipe having a smaller diameter. When the insert 22 is omitted the pipe clip 11 can be used to hold a pipe with a larger diameter. The configuration of the pipe clip 11 and an insert part 22 allows the use of one clip body 12 which may be used for a certain pipe diameter, and which may be combined with an insert part 22 adapted for use with a pipe of a smaller diameter. There may be several insert parts 22 with different inner diameters available for combination with the annular clip body 12, to make the pipe clip suitable for different pipe diameters.

In FIGS. 4 and 5 the pipe clip 11 is shown in which the insert part 22 is omitted. As is illustrated in FIG. 5 the flanges 14 can be pinched together, whereby a portion 12A of the annular clip body 12 located between the flanges 14 and opposite the slit 13 is deformed and serves as a hinge portion and whereby the slit 13 is spread open (indicated by reference numeral 13') so as to allow insertion of a pipe in the clip body 2 in the transverse direction of the pipe. The opening of the pipe clip 11 to arrange it over a pipe by pinching the flanges 14 is comparable to the working of a clothes-peg or clothes-pin. In that regard the first flanges 14 preferably have a sufficient length to provide a sufficient lever arm facilitating the single handed operation of the pipe clip 11 during installation on a pipe.

Figure 8:
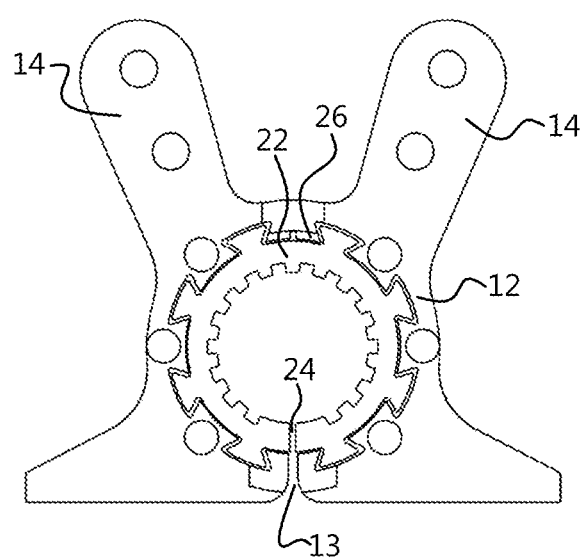
FIG. 8 shows a front elevational view of the pipe clip of FIG. 2, wherein the insert part and the pipe clip have aligned slits.

The slit 24 in the insert part 22 may be aligned with the slit 13 in the annular clip body 12 as is shown in FIG. 8. In such a configuration the pipe clip 11 including the insert 22 may be opened as a cloth-pin or cloth-peg by pinching the first flanges 14 together, as is described in the above in relation to FIG. 5. This allows the pipe clip 11 including the insert 22 to be placed on a pipe. Although not shown in the figures, the insert part 22 may also have a hinging line opposite the slit 24 to make the spreading of the slits 24 and 13 easier during installation.

Figure 9:
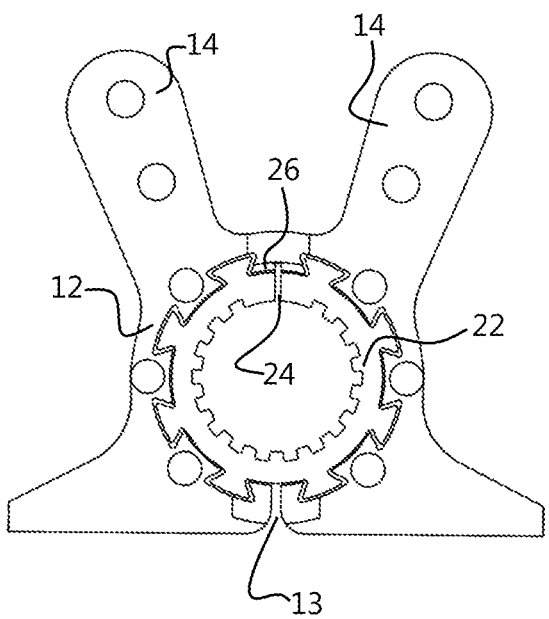
FIG. 9 shows a front elevational view of the pipe clip of FIG. 2, wherein the insert part and the pipe clip have misaligned slits.

Another option is to misalign the slit 24 in the insert part 22 and the slit 13 in the annular clip body 12 as is shown in FIG. 9. In this configuration the insert part 22 and the annular clip body 12 may be arranged transversely over the pipe separately after which they are assembled by inserting the insert 22 in the annular clip body 12 in the axial direction. In this configuration the insert part 22 functions as a locking means to maintain the annular clip body 12 closed around the pipe.

The insert part 22 is provided on an outer surface with a locking member and the annular clip body 12 is provided with a locking member on the radial inner surface to cooperate with the locking member of the insert part 22 to interlock the insert and the annular clip body 12 in the axial direction. In a particular embodiment, the inner side of the annular clip body 12 is provided with a small ramp 26 from either head end towards the centre, seen in axial direction. In the mentioned axial centre an intermediate space is formed between the ramps 26. The insert part 22 has a transverse ridge in the middle extending in the tangential direction between two splines 23. The ridge moves over one of the ramps 26 when the insert part 22 is inserted in the annular clip body 12 until it reaches the axial centre portion, which is when the insert part 22 is fully inserted in the annular clip body 12. When it reaches the axial centre portion it snaps into the intermediate space between the two ramps 26 and the insert 22 is locked in the annular clip body 12. The pipe clip 11 including the insert 22 can now be handled as a unit to arrange it around a pipe and mount it to a support structure. The ramps 26 only have a moderate height such that if necessary, the insert part 22 may still be removed from the annular clip body 12.

Figure 6:
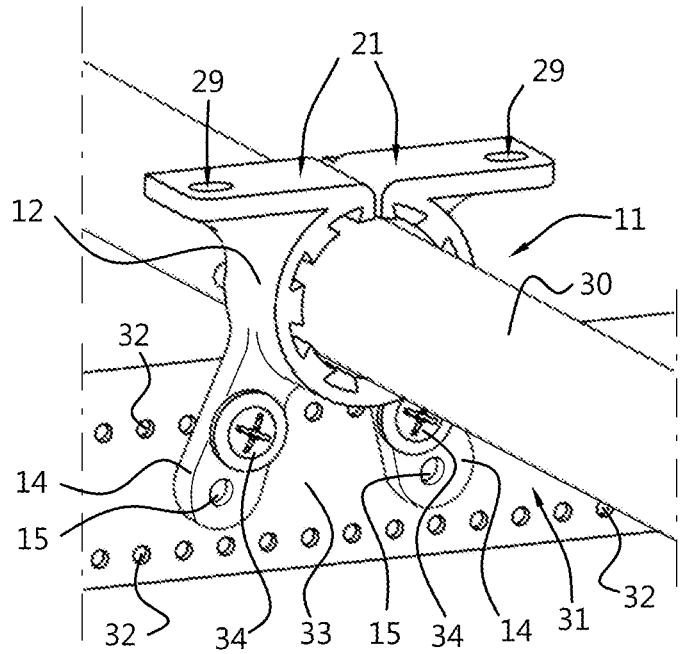
FIG. 6 shows in a view in perspective the pipe clip of FIG. 2, without an insert part, in a possible mounted state.

FIG. 6 shows a pipe clip 11 in which the insert part 22 is omitted. The pipe clip 11 is arranged around a pipe 30. The pipe clip 11 is mounted to a structural element 31 having holes 32 in a wall portion 33 thereof. The support surfaces 16 of the flanges 14 are arranged against the wall portion 33 and for fastening the pipe clip 11 to the structural element 31, a screw 34, for example a self-tapping screw 34, is passed through one of the holes 15 in the flange and screwed into one of the holes 32 in the wall portion 33. Both flanges 14 are fastened to the structural element 31 in this way.

Figure 7:
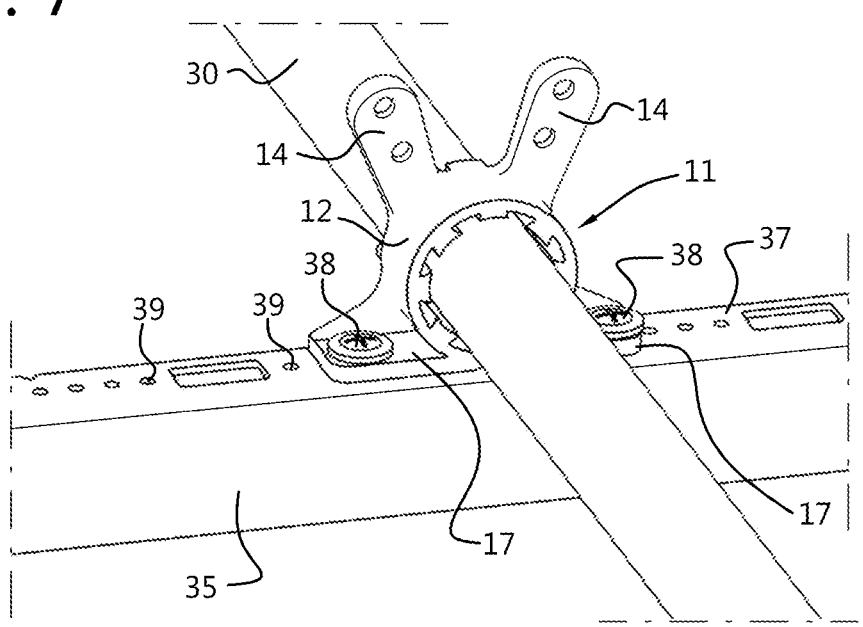
FIG. 7 shows in a view in perspective the pipe clip of FIG. 2, without an insert part, in another possible mounted state.

FIG. 7 illustrates another way to mount the pipe clip 11 to a structural element 35. The second flanges 17 are placed with their support surface 21 on a wall portion 37 of the structural element 35 and are mounted thereto by means of screws 38 passing through the mounting holes 29 in the flanges 17. The screws 38 may be self-tapping screws, which are screwed in small screw holes 39 in the wall portion 37 of the structural element 35.

FIGS. 6 and 7 illustrate that the pipe clip 11 can be used in a versatile way to fasten a pipe 30 in a variety of ways to structural members. Even if the flanges 14 may not be used to fasten the pipe clip 11 to the structural member as is shown in FIG. 7, they may advantageously be used as pinching means to open the slit 13 (cf. FIG. 5) to allow placement of the pipe clip 11 on the pipe 30. The advantage is that by the flanges 14, and also the flanges 4 in the embodiment of FIG. 1, the pipe clip 1 and 11, respectively, may be opened by using one hand only and then be placed on the pipe 30.

Figure 10:
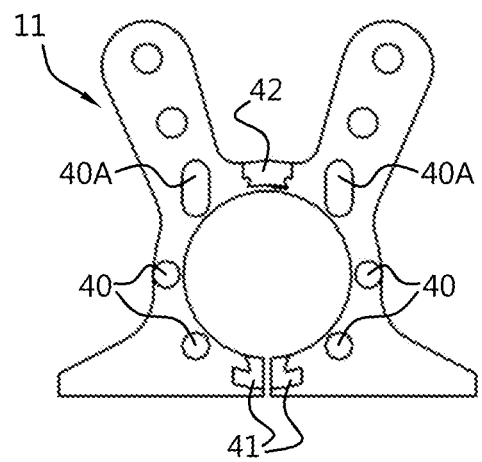
FIG. 10 shows a front elevational view of another embodiment of a pipe clip according to the invention.

On the head end surface 19 of the annular clip body 12 a number of studs 40, 40A, 41, 42 is formed, which studs 40, 40A, 41, 42 are distributed over the circumference, as is illustrated in FIGS. 3 and 10. The embodiment of the pipe clip shown in FIG. 3 has six round studs 40, whereas the embodiment of FIG. 10 has four round studs 40 and two studs 40A with an oblong shape.

Figure 11:
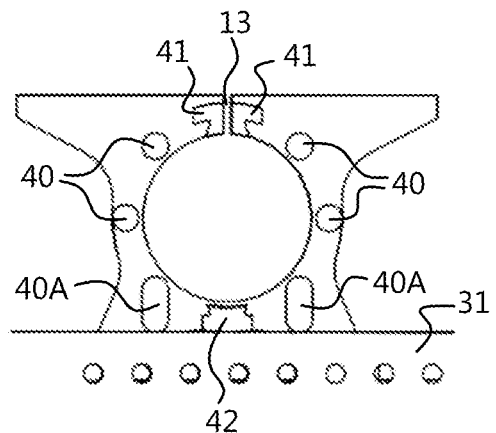
FIG. 11 illustrates a mounting option of the pipe clip of FIG. 10.
Figure 12:
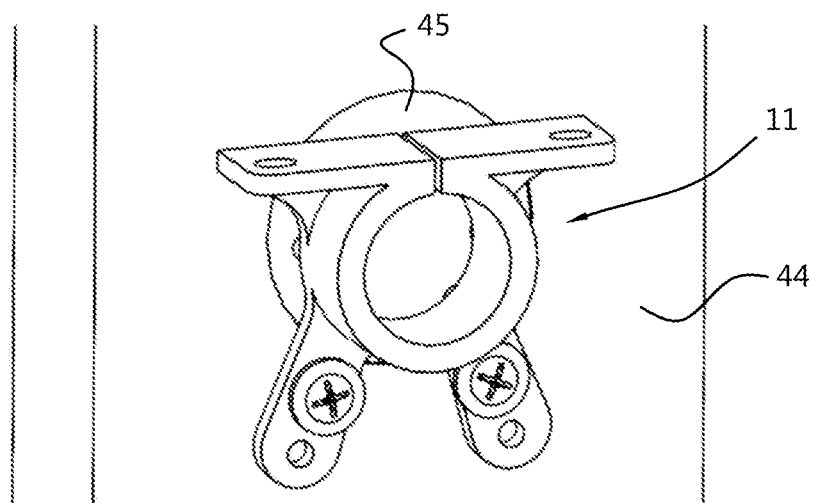
FIG. 12 illustrates another mounting option of the pipe clip of FIG. 10.
Figure 13:
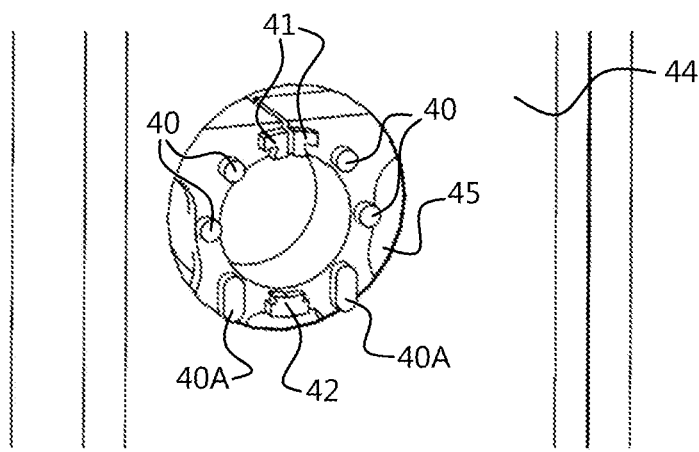
FIG. 13 shows the mounting option of FIG. 12 from another side.

In FIGS. 11-13 is illustrated how the studs 40, 40A, 41, 42 may aid in fixing the pipe clip 11 in a sturdy manner to a structural member 31 or 44. In FIG. 11 is shown how the pipe clip 11 is fastened to the structural member 31 as is also shown in FIG. 6. Visible in FIG. 11 is that the pipe clip 11, which is fixed by the first flanges 14 to a wall portion 33, rests with the studs 40A and 42 on the edge of the structural member between the wall portion 33 and another perpendicularly adjoining wall portion. These studs 40A and 42 resting on the edge provide additional support for the pipe. Moreover the studs 40A and 42 assure that the annular clip body is not deformed at the hinge portion 12A and the pipe clip 11 is difficult to open when mounted.

In the example of FIGS. 12 and 13 is illustrated how the pipe clip 11 is attached to a flat wall of a structural member 44, wherein the annular clip body 12 is positioned in front of a hole 45 in the wall. The studs 40A rest on the edge of the hole 45 as is visible in FIG. 13. Which provides additional support for the pipe received in the pipe clips 11 and also resists spreading apart of the clip halves.

Figure 14:
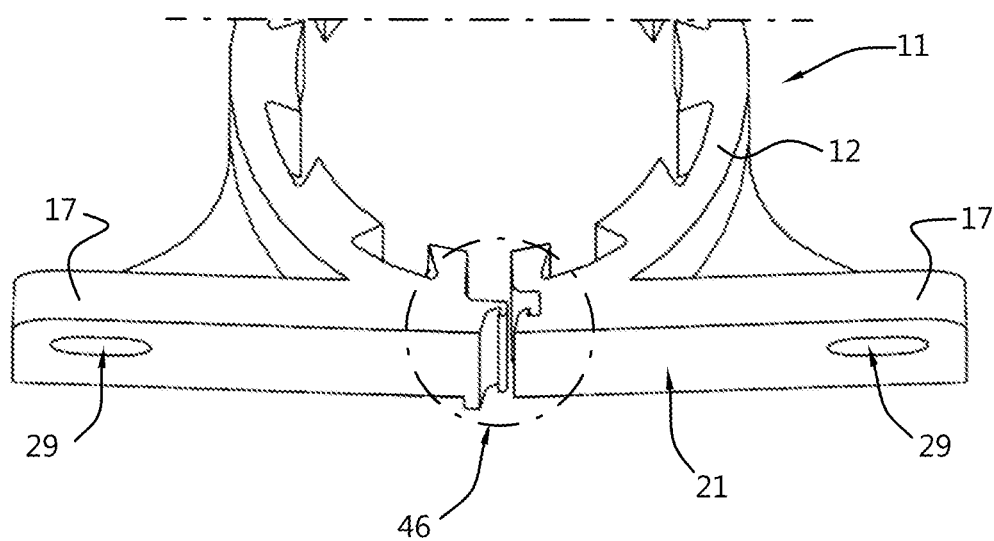
FIG. 14 shows an alternative embodiment of the pipe clip of FIG. 2, without an insert.

In FIG. 14 is shown a further embodiment of the pipe clip 11 as is shown in FIG. 3. In this embodiment the annular clip body 12 has a hook closure 46 at the slit 13, which hook closure 46 is encircled in FIG. 14. The hook closure 46 may be closed in a snapping manner and maintains the annular clip body 12 closed after the clip body is arranged around the pipe. Thus even if the pipe clip 11 is attached to a structural part by means of the flanges 14, the annular clip body 12 is firmly held in a closed position by the hook closure 46.

The plastic pipe clips 1 and 11 may be made from several suitable plastics materials, such as a polypropylene (PP) or a polyamide (PA). Preferably an injection moulding process is used to manufacture the pipe clips in large numbers. The insert parts 22 may be made of the same material as the annular clip body, but may also be made of a material with a different, desired property. It may for example be made of a better vibration insulating material than the clip body 12 is made of.

The invention claimed is:

1. A plastic pipe clip comprising:
    a slitted annular body having a through slit to avow receiving a pipe in the annular body;
    a pair of first mounting flanges integrally formed on the annular body on an opposite side of the annular body as where the slit is located, wherein the pair of first open the silt, the first mounting flanges having respective first support surfaces through which mounting holes extend, the pair of first mounting flanges adapted to mount the pipe clip to a first support structure surface;
    a pair of second mounting flanges integrally formed on the annular body flanking the slit and extending from the annular body, the second mounting flanges having respective second support surfaces through which mounting holes extend, the pair of second mounting flanges adapted to mount the pipe clip to a second support structure surface;
    wherein the first support surfaces are configured to be positioned against the first support structure surface, and the second support surfaces are configured to be positioned against the second support structure surface, wherein the first support surfaces define a first plane and the second support surfaces define a second plane, wherein the first plane and the second plane are perpendicular to each other.

2. The plastic pipe clip according to claim 1, wherein the second mounting flanges and the annular body define an omega shape seen in a front view in an axial direction of the annular body.

3. The plastic pipe clip according to claim 1, wherein the first mounting flanges are formed as ears extending from the annular body.

* * * * *